July 10, 1951     P. M. L. LATROBE     2,560,392
VARIABLY ILLUMINED PLATE
Filed June 5, 1945                                        3 Sheets—Sheet 1
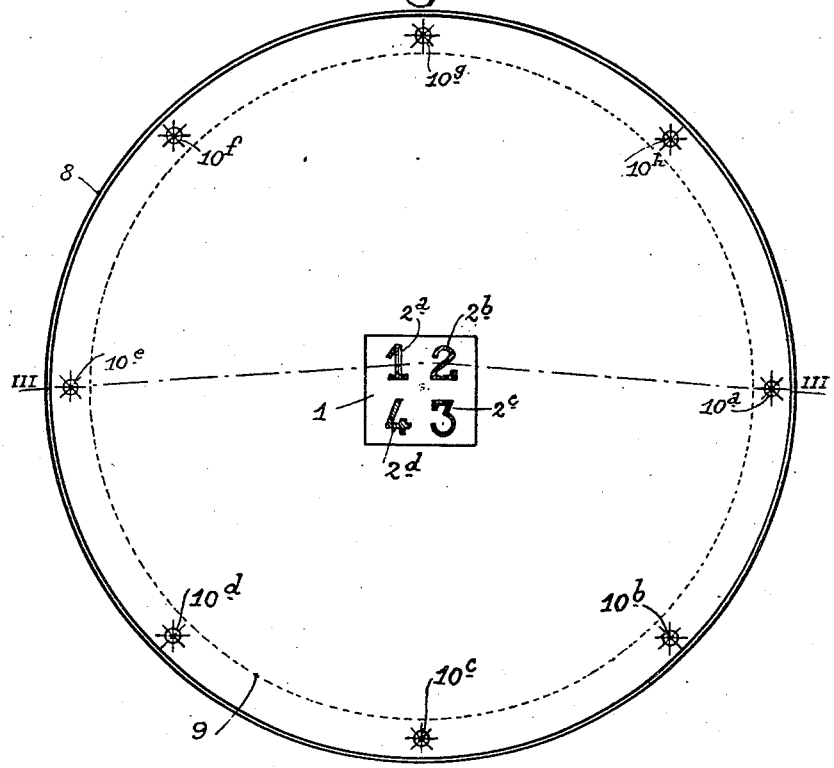
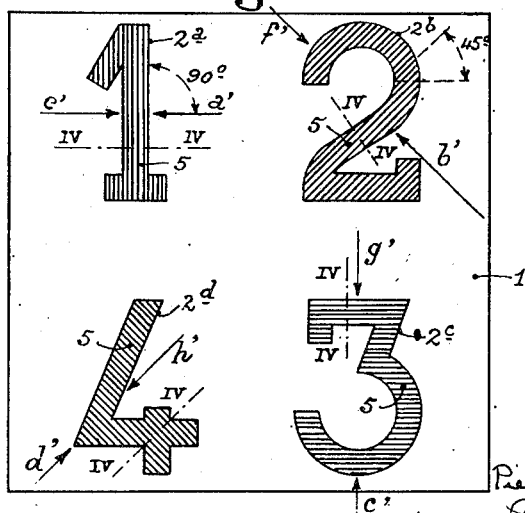
Inventor
Pierre M. L. Latrobe
By Mason, Porter & Diller
Attorneys

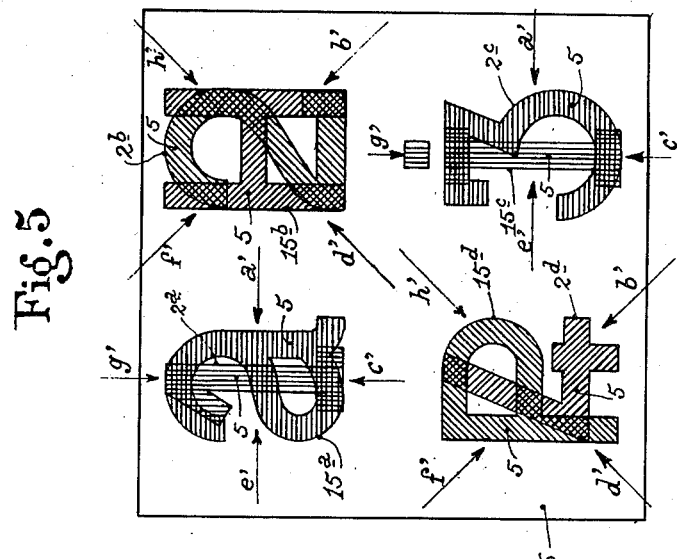
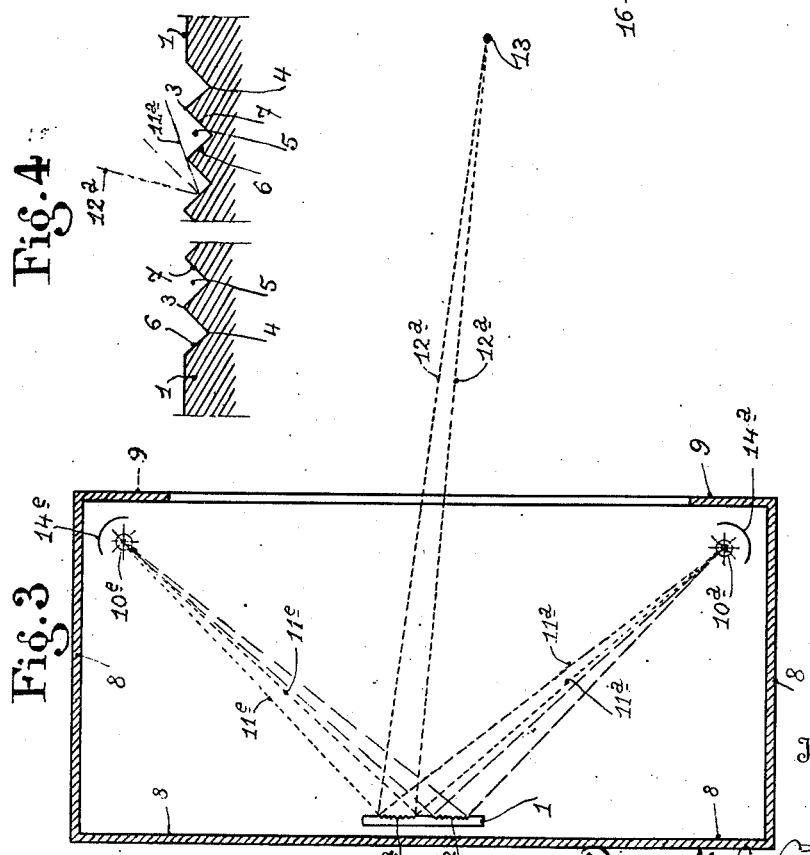

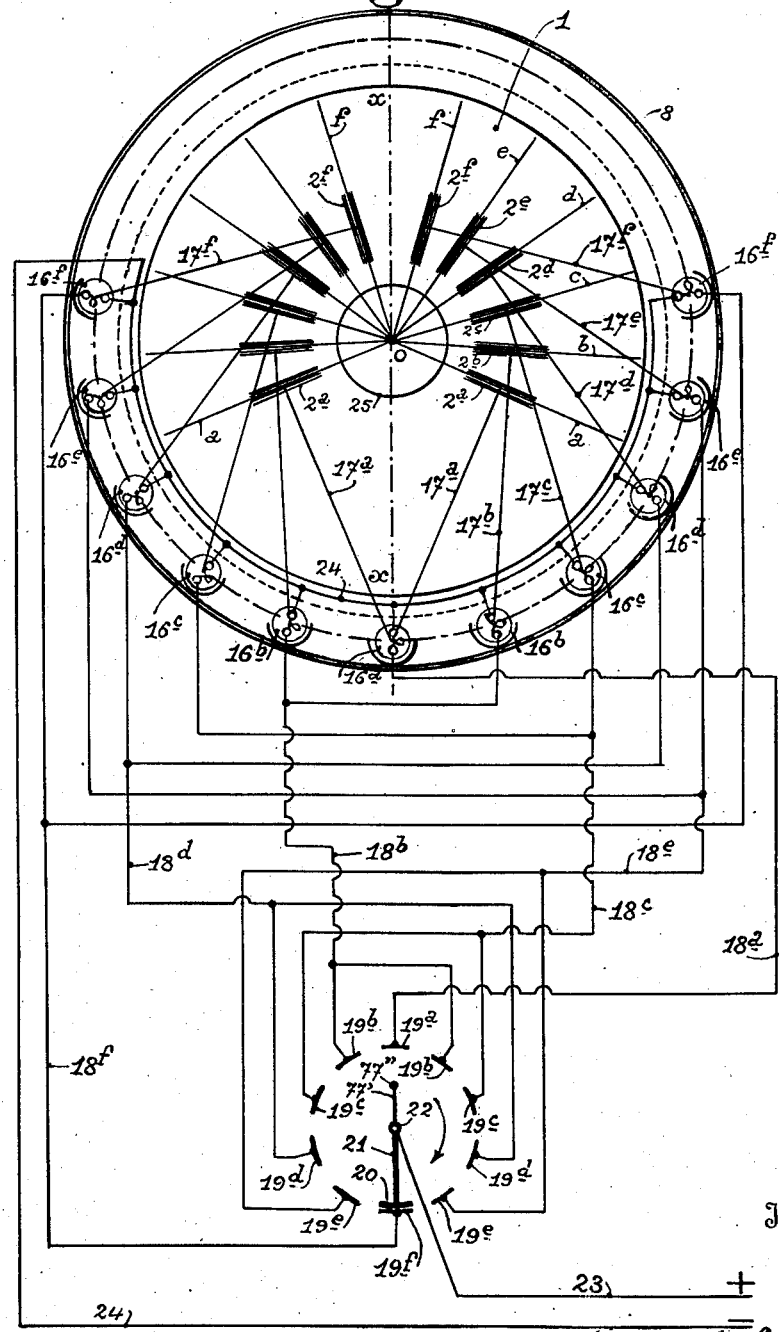

Patented July 10, 1951

2,560,392

UNITED STATES PATENT OFFICE 2,560,392

VARIABLY ILLUMINED PLATE

Pierre Michel Louis Latrobe, Paris, France

Application June 5, 1945, Serial No. 597,652
In France June 5, 1944

2 Claims. (Cl. 40—137)

The present invention has as its aim a method and a device for utilising carriers provided with mouldings of differently oriented networks or systems of reliefs and depressions of the types described in the United States Letters Patent to Dufay Apr. 2, 1935 No. 1,996,539; Mar. 9, 1943 No. 2,313,489 and the French Patent No. 821,804 of Aug. 17, 1936. From now on, the carriers so moulded will be known as "plates with differently oriented moulded systems of reliefs and depressions" or, more simply, as "plates"; on these, the differently adjusted moulded networks or systems of reliefs and depressions can make drawings and designs of every kind, whether decorations, inscriptions, or designs, or, more generally, drawings and representations of all kinds.

The present invention aims, in a general manner, at particular applications of these plates.

Following the general method of utilizing a plate provided with differently oriented systems of reliefs and depressions of one of the types described above, forming the objects of the present invention, on the one end, the orientations or settings of the different local systems of reliefs and depressions and the dimensions and contours of these different systems are established according to preselected forms and characteristics, and, on the other hand, the factors of reflection with regard to an observer's eye of the rays of light reflected by these different systems are successively modified at will, as a result producing varying successive optical reactions to the eye of the observer in accordance with a desired law.

Following my preferred manner of carrying out this method, first, at the time of the erection of the moulded plate, the differently set moulded systems of reliefs and depressions are arranged in such a way as to occupy sites, each one different in dimensions and contours to the others, on the plate; and, next, at the time of the use of this, rays of light of successively varying incidence are projected into the plate, in such a manner that different systems of reliefs and depressions of this plate appear successively with a maximum of luminosity, whilst, at the same moment, all the other systems of reliefs and depressions reflect less light to the observer, or even none at all, and the system which appears temporarily with the maximum luminosity then produces on the eye of the observer a dominant optical impression. Thus, if the local systems so observed successively by the observer form decorations or inscriptions, each distinct and independent one from another on this plate, it is possible to make them appear successively to this observer; e. g. if the different objects are outlined on the plate, they will be able to be seen one after the other by the observer, and the same with different inscriptions; figures, letters, words are drawn by the systems of reliefs and depressions on the plate, and they can be seen by the observer, successively and in any desired sequence.

As a modification for carrying out this method, then at the time of the setting up of the plate, various systems of reliefs and depressions are set up with equal and identical surfaces and contours, and then, at the time of the utilisation of this plate, the angles of incidence of rays of light which are projected on the plate are modified successively in a pre-determined manner, in order that the rays reflected by the reliefs and depressions of each of these local networks or systems of reliefs and depressions may, successively and temporarily, cause each network or system to appear with a maximum of luminosity and to produce a dominating optical impression in the eye of the observer; thus, the observer perceives, successively and in a determined order, local networks or systems, with equal surfaces and identical contours, but occupying distinct sites on the plate.

Following a particular manner of carrying out this process, on the one hand, on the plate, these networks or systems of reliefs and depressions of equal size and identical contours are set out one after the other, and, on the other hand, the variations of incidence of the rays of light falling on the plate are varied in such a manner as to make the said networks or systems appear successively in the order in which they are set out on the plate and, finally, the cadence of the variations of incidence of the light rays is such as to produce a continuity of visual sensations and to give the observer the impression of seeing only one network or system or one series of networks or systems continually changing place on the plate; an illusion of movement is thus created.

Numerous variations of movement and surface effects may be provided, simulating animation as in cinematography and giving successive images. In this way different areas of the plate may be presented simultaneously to produce a combined effect. The plate may be fixed and a succession of different light rays projected upon it and conversely a single light beam may illumine successively different portions of the plate. Several plates may be combined to produce a composite effect. The light may operate by reflection from the plate or transmission through it.

The invention also includes the appropriate devices to carry out the above broad purposes.

By way of example I have described the invention as illustrated by the accompanying drawings in which—

Fig. 1 is a front elevation of an apparatus adapted to the invention, the screen shutting out the luminous sources being taken off to let these latter be seen.

Fig. 2, on a larger scale is a partial front view, the positive plate being under view.

Fig. 3 is a cross section of the apparatus in Fig. 1, this section being made along the line III—III of that figure.

Fig. 4, on a considerably larger scale, is a cross-section made along one of the lines IV—IV of Fig. 2.

Fig. 5 is a front view of a positive plate erected with zones in which furrows are crossing each other and Fig. 6 is a partial front view of the arrangement of a modified apparatus in accordance with the invention provided with a plate of a particular type and with fixed sources of light, giving the spectator the impression of observing alternative movements. This figure gives as well, an electrical scheme for the mounting of light sources capable of giving this impression of alternating movement.

In these different figures the same reference signs denote the same parts.

Fig. 1, 1 is the plate constituted, for example, by a sheet of aluminium mounted on an appropriate support; on this sheet, local positive mouldings $2^a$, $2^b$, $2^c$, $2^d$, have been produced; each of these mouldings admit a network, pattern or system of reliefs 3 and of depressions 4 (Fig. 4) here formed by parallel furrows 5 forming flat faces 6 and 7 laid out lengthwise; these furrows are not visible to the unaided eye and a person situated at a distance from them normal for observation can neither see them nor make them out individually; these furrows can, for example, number from ten to thirty to the millimeter; in Figs. 1 and 2 of the drawings attached, for reasons of clearness, this width of from $\frac{1}{10}$ to $\frac{1}{30}$ of a millimeter has not been observed, and the lines drawn to represent the patterns must be considered as lines giving simply the direction of the furrows of each moulding executed in plate 1, it being understood that, in a plate, these lines cannot be individually distinguished by the human eye. Plate 1 is fixed, preferably, removably to the bottom of a box 8, here, circular in section, provided in its frontal part, with a screen 9 to mask the lighting lamps $10^a$, $10^b$, $10^c$, $10^d$ of Fig. 1. These lamps are, here, fixed; lamp $10^a$ is placed in such a manner that the light rays that it emits are perpendicular, or very nearly so, to faces 6 of one of the systems of $2^a$, e. g. of plate 1; in the same way, each of lamps $10^b$, $10^c$, $10^d$ emits a beam of light rays whose axis is on a plan perpendicular, or almost so, to the faces 6 of the systems $2^b$, $2^c$, $2^d$ which corresponds to lit.

In these conditions, lamp $10^a$ alone being lit, the facets 6 of the network $2^a$ will receive luminous rays $11^a$ placed in a cone almost perpendicular to the said facets, and they will reflect them in a direction $12^a$ towards one or several observers placed in 13 in front of the machine to whom system $2^a$ will thus appear brightly lit up; at the same time, the light rays emanating from the same source $10^a$ and striking systems $2^b$ and $2^c$ will fall on the corresponding facets 6 of those networks which are inclined at 45° with reference to those of system $2^a$ at an angle of 45° with reference to these facets in such a way that the light rays which are reflected by these facets $2^b$ and $2^c$ will be perpendicular to the reflected light rays $12^a$ and will not be seen by the observer or observers aforementioned; it will follow that these systems $2^b$ and $2^d$ will only appear to this observer with a reduced luminosity; as for the light rays falling from the same lamp $10^a$ on system $2^c$ whose facets are largely parallel to these facets, they will not be reflected by the said facets, this zone, $2^c$, remaining, thus, relatively dark.

In these conditions, zone $2^a$ will appear with a maximum of luminosity and will exercise a dominating influence on the observer; this zone has been defined, here, by an outline representing numeral 1, this numeral will then be read on the screen by the observer of the apparatus; on the contrary, the other zones outlined by lines representing the numerals 2, 3, 4, will not be specially seen and these numerals may not be readable; on the contrary, on extinguishing lamp $10^a$ and lighting lamp $10^b$ situated on a plane perpendicular to the direction of the facets of the furrows of zone $2^b$, and passing mainly down the centre of this zone, the facets 6 of this system will be illuminated with the maximum power and zone $2^a$ will no longer be seen by the observer aforementioned, whilst zone $2^b$ will strike his notice; in consequence, the observer will see numeral 2; in the same way, by successive separate utilisations of lamps, $10^c$, $10^d$, system $2^c$, $2^d$ will successively exercise dominating influences on the observer and will successively retain his attention, numerals 3 and 4 being thus read successively and separately by the observer.

If other light sources $10^e$, $10^f$, $10^g$, $10^h$ are arranged in the apparatus in positions diametrically opposed in relation to those of sources $10^a$, $10^b$, $10^c$, $10^d$ then, lighting successively lamps $10^e$, $10^f$, $10^g$, $10^h$, the facets 7 of each of systems $2^a$, $2^b$, $2^c$, $2^d$, will be lit up successively, and thus each of these systems will be seen, successively by the observer, in exactly the same way as with lamps $10^a$, $10^b$, $10^c$, $10^d$.

Through the present invention, the diametrically opposed lamps of the machine can, equally well, be mounted in parallel lines on a common circuit; thus facets 6 and 7 of the same system are lit up simultaneously and the effects described above are reinforced, each of the zones appearing successively being, then, more strongly lit up.

Other reinforcements of the lighting of each of the plate patterns can be obtained by combining each light source with:

a). a reflector (reflector $14^a$ for source $10^a$, $14^e$ for source $10^e$) for projection on the plate light emitted by this source (Fig. 3), and b). the light condensers not shown and capable of being set up in front of each of these sources.

As has been said, due to the present invention, also, results similar to those obtained before will also be obtainable according to the circumstances, either with the help of a single mobile light source which will be taken successively on to $10^a$, $10^b$, $10^c$, $10^d$, and which will be lit up upon reaching each of these positions and extinguished on leaving it, or with the help of two diametrically opposed sources in box 8, the said sources being brought successively to $10^a$, $10^e$, $10^b$, $10^f$, $10^c$, $10^g$, $10^d$, $10^h$, and lit up on reaching each of these positions and extinguished on leaving it.

In another variation in carrying out the invention, the only mobile luminous source is maintained permanently lit during its movings, or rather, in the case of the utilisation of two light sources, diametrically opposed, these two sources are kept permanently lit during the course of their rotation.

In the preceding terms, plate 1 has been presumed to be provided with a series of zones $2^a$, $2^b$, $2^c$, $2^d$ of reliefs and depressions of outlines and sizes different one from another; but, as has been said, systems set up on plate 1 can intersect one another; thus, in Fig. 5 it has been assumed that on each of systems $2^a$, $2^b$, $2^c$, $2^d$, of Fig. 2, another system with a different setting has been traced; here, a system $15^a$ formed of furrows perpendicular to those of system $2^a$ intersect this; in the same way, the furrows of systems $15^b$, $15^c$, $15^d$, are respectively perpendicular to those of systems $2^b$, $2^c$, $2^d$.

In these conditions, by putting plate 16 of Fig. 5 in the machine shown in Figs. 1 and 3, the observer will see simultaneously systems $2^a$ and $15^c$, then $2^b$ and $15^d$, $2^c$ and $15^a$, $2^d$ and $15^b$. Here, the outlines of the systems which cross one another are distinct, one from another; but these outlines could, also, be mixed, in such a way that one and the same system will appear to the observer with its maximum luminosity twice as often when the lamps are successively put into use.

In Figs. 2 and 5, the arrows $a$, $b$, ... $g$, $h$ show the direction of the light rays emitted by lamps $10^a$, $10^b$ ... $10^g$, $10^h$.

As has been shown, before, the zones sucessively presented to an observer of plate 1 with a maximum of luminosity can also, be identical one with another, both in their sizes and their outlines. Thus, in Fig. 6, there has been shown a box 8 in which is set out a plate 1 admitting of systems $2^a$, $2^b$, $2^c$, $2^d$, $2^e$, $2^f$ of juxtaposed elements formed of furrows whose directions $a$, $b$, $c$, $d$, $e$, $f$, correspond to the rays coming from a common source 0.

In these conditions, if luminous sources are set out on points $16^a$, $16^b$ ... $16^f$ in such a way as to emit beams of light from axes situated on planes $17^a$ ... $17^f$ respectively perpendicular in the directions $a$, $b$, $c$, $d$, $e$, $f$ to the furrows of these different systems, and passing through their centres, these different systems are going to appear successively and singly to the observer with a maximum of luminosity, then to disappear; it follows that, if the rate of these appearances and disappearances is suitably regulated in such a way as to give continuity of impressions on the retina of the observer's eye, he has the impression that that same zone $2^a$ is animated with continuous movement and is shifting from $2^a$ to $2^f$ i. e. is turning around centre 0. If, then, all around centre 0, other systems 2 are set out and uniformly distributed, and if each of these systems is provided with a temporary source of lighting, through the successive putting into action of these different sources, the observer will have the impression that zone $2^a$ is animated with a continuous rotatory movement around axis 0.

Through the present invention, also ray-producing systems of the type described above can be set out symmetrically with reference to an axis X—X; e. g. a series of systems $2^a$ ... $2^f$ is established on each side of the axis X—X of Fig. 6; in addition, lamp $16^a$ is placed on this axis and at each side of this axis is a series of lamps $16^b$ to $16^f$; $16^a$ is bound by a conductor $18^a$ to a fixed contact $19^a$; the two lamps $16^b$ are bound to a common conductor $18^b$ bound to two contacts $19^b$ symmetrical with reference to $19^a$; in the same way, lamps $16^c$, $16^d$, $16^e$ are bound respectively by conductors $18^c$, $18^d$, $18^e$ to respective contacts $19^c$, $19^d$, $19^e$ and the two lamps $16^f$ are bound by conductor $18^f$ to the single contact $19^f$. One contact 20 is carried by an arm 21 supported on an axis 22 animated by a continuous movement of rotation at an appropriate speed supplied by any kind of motor; electric, mechanical or any other.

Axis 22 is bound, by a conductor 23, to one of the poles of a source of electricity, and all the lamps are bound by a common conductor 24 to the other pole of this source.

In these conditions and all the above described fixed contacts $19^a$ to $19^e$ being set out in a circle around the rotative contact 20 which turns at an appropriate speed, the observer sees successively and individually each of the pairs of systems $2^a$ and $2^b$ of Fig. 6; systems $2^a$ situated at the right of axis X—X seems animated with an alternative movement of rotation around centre 0; system $2^a$ situated on the other side of this axis seems animated with a movement symmetrical to the preceding one with reference to the aforementioned axis.

Extremely varied effects can thus be obtained with the aid of the device of Fig. 6. Thus, if the outline given to each of systems $2^a$ ... $2^f$ is that of a wing of a bird whose other body parts will be, also, shown on the plate, the observer will get the impression of seeing this bird flap its wings.

The preceding effects can, it is to be understood, be rendered yet more varied by the utilisation of coloured-light rays emitted either by one or several of sources $16^a$ to $16^f$ or by auxiliary sources of light. All the light sources $16^a$ to $16^f$ and these auxiliary sources, or certain of them, can be provided with reflectors and light condensers concentrating, on one or several of the systems or on the whole of those systems of the plate, the light rays emitted by these sources. It must be understood that light reflectors and condensers could equally well be utilised in combination with these light sources to concentrate light rays on one or several parts of systems. Of course, coloured light rays emitted by sources $16^a$ to $16^f$ may also be of various colours.

Following the invention, this apparatus can, equally well, be utilised for the observation of plates permeable to light rays; for this purpose, it suffices to set out between the two drums $58^1$ and $58^2$ a box $60'$, $61'$, $62'$, $64'$ for the lighting of the rear face of each plate, the lamps 64 being, then, to suit the circumstances, either kept on or extinguished.

As stated above, the plates allowing the utilisation of the means described in the present description constitute new industrial products equally within the scope of the present invention, as they are original plates, e. g., plates obtained with the aid of a negative matrix by direct, successive moulding of differently set patterns or plates obtained by the reproduction of original plates.

I declare that what I claim is:

1. A device including a fixed reception stand, a plate thereon provided with various sets of relatively inclined systems of minute parallel alternate reliefs and depressions, each set of these relatively inclined systems of reliefs and depressions representing a preselected object, a series of fixed light sources arranged laterally in front of said plate and around it, and means for lighting and extinguishing successively each of the said light sources, with the object of showing successively to an observer all the objects represented on the plate.

2. A device including a fixed reception stand, a plate thereon provided with identical sets of relatively inclined systems of minute parallel alternate reliefs and depressions, each of these sets of relatively inclined systems of reliefs and depressions representing the same object and all these sets being arranged uniformly around a central point, a series of fixed light sources arranged laterally in front of the said plate and around it, and means for lighting and extinguishing successively each of the said light sources, with the object of giving to an observer the sensation of successive displacements of the object represented on the plate, along a circular line.

PIERRE MICHEL LOUIS LATROBE.

REFERENCES CITED

The following references are of record in the file of this patent:

UNITED STATES PATENTS

| Number | Name | Date |
|---|---|---|
| 794,045 | Pope et al. | July 4, 1905 |
| 830,834 | Hudson | Sept. 11, 1906 |
| 1,219,731 | Hall | Mar. 20, 1917 |
| 1,354,471 | Doner | Oct. 5, 1920 |
| 1,579,249 | Russell | Apr. 6, 1926 |
| 1,777,550 | Craig | Oct. 7, 1930 |
| 1,996,539 | Dufay | Apr. 2, 1935 |
| 2,204,435 | Musaphia | June 11, 1940 |
| 2,269,521 | Darrah | Jan. 13, 1942 |
| 2,313,489 | Latrobe | Mar. 9, 1943 |
| 2,373,104 | Dieffenbach | Apr. 10, 1945 |

FOREIGN PATENTS

| Number | Country | Date |
|---|---|---|
| 18,364 | France | Apr. 1, 1914 |
| | (Addition to Pat. No. 451,073) | |
| 35,966 | Switzerland | Feb. 9, 1906 |
| 106,830 | Australia | Mar. 6, 1939 |
| 327,576 | Great Britain | Apr. 10, 1930 |
| 486,906 | Great Britain | June 13, 1938 |
| 489,409 | Germany | Jan. 16, 1930 |
| 748,691 | France | July 7, 1933 |
| 769,096 | France | June 5, 1934 |
| 821,804 | France | Dec. 14, 1937 |